June 9, 1959   B. R. BETTER   2,890,054
SPLINE CHUCKS AND ARBORS
Filed July 3, 1958   2 Sheets-Sheet 1

INVENTOR
BERNARD R. BETTER
BY
ATTORNEYS

June 9, 1959

B. R. BETTER 2,890,054

SPLINE CHUCKS AND ARBORS

Filed July 3, 1958

INVENTOR
BERNARD R. BETTER

BY

ATTORNEYS

United States Patent Office 2,890,054
Patented June 9, 1959

2,890,054

SPLINE CHUCKS AND ARBORS

Bernard R. Better, Chicago, Ill., assignor to Scully-Jones and Company, Chicago, Ill., a corporation of Illinois Application July 3, 1958, Serial No. 746,490

16 Claims. (Cl. 279—1)

This invention relates to chucks and arbors and, more particularly, to a new and improved chuck and arbor for holding an internally or externally splined work piece for machining or finishing operations.

In the manufacture of many parts having internal or external splines or teeth, it is usually necessary to machine or otherwise finish one or more surfaces concentric with the splines. Heretofore, such parts have been supported in relatively complicated chucking or arbor devices having accurate machining, requiring careful adjustment and which were difficult to keep in proper working order. Such devices have been expensive and the means of actuating such devices have been complex. As for example, in the spline arbors, pins, pawls, camming means, transverse screw means and other complex mechanisms have been used as well as devices which have included the expanding or contracting of resilient material in the splines, etc.

My invention comprises a simplification of the prior art devices in that it simply and directly transfers an axial force to produce a circumferential movement through a single member. This simplification and improvement of prior art devices, therefore, is the principle object of my invention.

I accomplish this principle object by the provision of a supporting member upon which is affixed an axially splined sleeve member adapted to cooperate with the splines of a work piece or a tool. The sleeve member is provided with portions having slots cut obliquely to the splines whereby upon actuation of an axial force transmitting member, part of the slotted portion will tend to rotate circumferentially thus chucking the work piece. My axial force transmitting member may comprise a simple threaded nut means on the supporting member for hand operation or may comprise means permitting power actuation, as for example, by the tail stock of a machine tool. My invention also contemplates the use of such a splined arbor either as a mandrel having external splines or as a chuck having internal splines on the respective sleeves thereof.

Accordingly, still another object of my invention is the provision of a new and improved simple arbor or chuck utilizing slotted splines, parts of which move circumferentially in response to the application of pressure axially whereby a work piece is chucked.

Still another object of my invention is the provision of a simple and improved arbor whereby axial force may be simply and directly transferred to circumferential movement of one portion of the chuck to hold a work piece, which axial force is accomplished either manually or by power operation.

Other and more particular objects of my invention will be apparent to those skilled in the art from the following description and drawings forming a part hereof and wherein.

Figure 1:
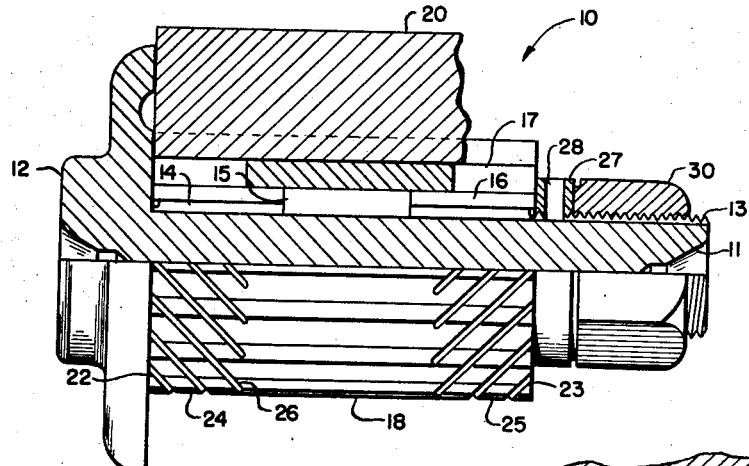
Fig. 1 is an elevational view, partly broken away, illustrating to advantage a slotted spline arbor constructed in accordance with the teachings of my invention.
Figures 2, 3:
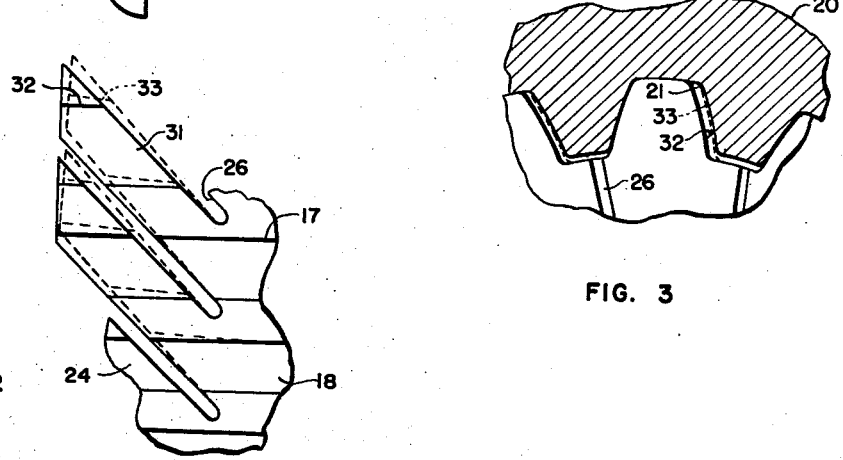
Fig. 2 is an enlarged detailed view of the splined portion of the arbor illustrated in Fig. 1 showing the movement of the slotted portion to chuck the work piece.
Fig. 3 is an enlarged cross-sectional view of a slotted portion illustrating to advantage the movement of the splined teeth to chuck the work piece.

Turning now to the drawings and in particular to Figs. 1, 2 and 3 thereof, it can be seen that I have provided a tool comprising a splined arbor, indicated in its entirety as 10, having a shaft or supporting mandrel 11, provided at its left end with a means, indicated in its entirety as 12, for incorporating the arbor 10 in a rotating spindle of a machine tool (not shown) and provided at its right end with external threads 13. The intermediate portion of the supporting mandrel between the ends 11 and 12 is provided with a slot 14 in which a key 15 is inserted to cooperate with a slot 16 in a sleeve member 17 in close fit thereon. Sleeve member 17 will be driven by said mandrel 11 in the conventional manner and is externally splined as at 18 to cooperate with a work piece 20, internally splined as at 21 (see Fig. 3).

At the end 22, 23 of the splined sleeve member I have provided portions 24, 25, each of which is provided with a plurality of slots about the periphery of the sleeve, indicated in their entirety as 26, which extend transversely of the splines and, in the embodiment illustrated, are disposed obliquely at a selected angle, such as at a 45° angle, transverse to the axis of rotation of the tool, equally spaced from each other and extending from the extreme left and right ends 22, 23 of the sleeve inwardly. These slots are milled or otherwise cut through the sleeve member 17 so that a space is provided to provide a deflection of the remaining portions as will be explained. At end 23, the right end of the sleeve, I have provided an axially movable washer 27 keyed to the shaft mandrel 11 by key or pin 28 in slot 14. Nut 30 threadably received on threads 13, when actuated, will move the washer 27 to the left, as illustrated in the drawing, stressing the portions 24, 25 of the sleeve containing the slots 26. As can be appreciated, axial force on the ends of the sleeve will cause the portions remaining between the slots to move circumferentially and fill the slotted space by reason of the fact that portions 24 and 25 tend to become reduced axially. For example, the portion of the sleeve indicated in Fig. 2 as 31, having a side 32 forming one side of a tooth of the splines will tend to move towards the position 33, illustrated by dotted lines in Fig. 2. Note in Fig. 3 that the side 32, with respect to the position 33, will thus tightly grip or lock the work piece 20 to the sleeve. Thus, it can be seen that by the simple axial force being applied to the sleeve the circumferential movement of the slots or the portions between the slots lock and center the work piece for machining or other operations.

In the following description of the other embodiments of my invention, I will use the same reference numerals to designate like parts having similar function or operation with suffixes a, b, c and d where practical.

Figures 4, 5:
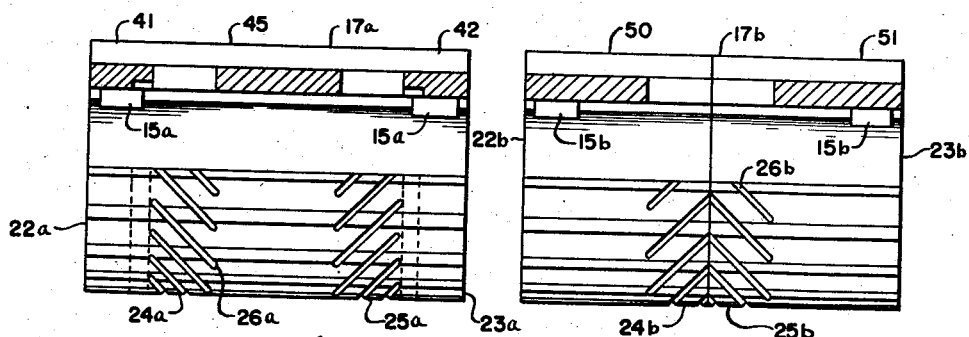
Fig. 4 is an elevational view, partly broken away, illustrating another embodiment of my invention.
Fig. 5 is still another embodiment of my invention.

The sleeve member 17a illustrated in Fig. 4 is substantially identical with the sleeve member illustrated in Fig. 1 except that slotted portions 24a and 25a with slots 26a are intermediate the ends 22a, 23a of the member. The forming of the slots may be accomplished, in the embodiment illustrated, in several ways as by chemical or spark gap machining or preferably by milling the slots in a manner shown in Fig. 4 in an inner ring 40 and welding two outer rings 41 and 42 respectively to the inner ring. In this embodiment keys 15a may be used to perform the same function as the key 15 in Fig. 1. Since the operation of the sleeve 17a is substantially identical in function as the sleeve 17 of Figs. 1, 2 and 3 no further description is deemed necessary.

The sleeve member 17b of Fig. 5 is substantially identical with the sleeve member illustrated in Figs. 1, 2 and 3 except that the slots 26b in slotted portion 24b, 25b are located centrally of the sleeve and in abutting relation with one another as illustrated. The forming of the slots 26b may be accomplished in the embodiment illustrated by the above suggested methods or by making the sleeve of two rings 50, 51, the ends of which abut each other. Rings 50, 51 in this embodiment are preferably not affixed together as by welding but left free of each other and obviously the slots 26b of portions 24b and 25b need not be aligned or open up into each other as illustrated. Also, in this embodiment keys 15b may be used to perform the same function as key 15 as described in connection with Fig. 1 and since the operation of this sleeve 17b is substantially identical with the sleeve 17 described in connection with Fig. 1, no further description is deemed necessary.

Figure 6:
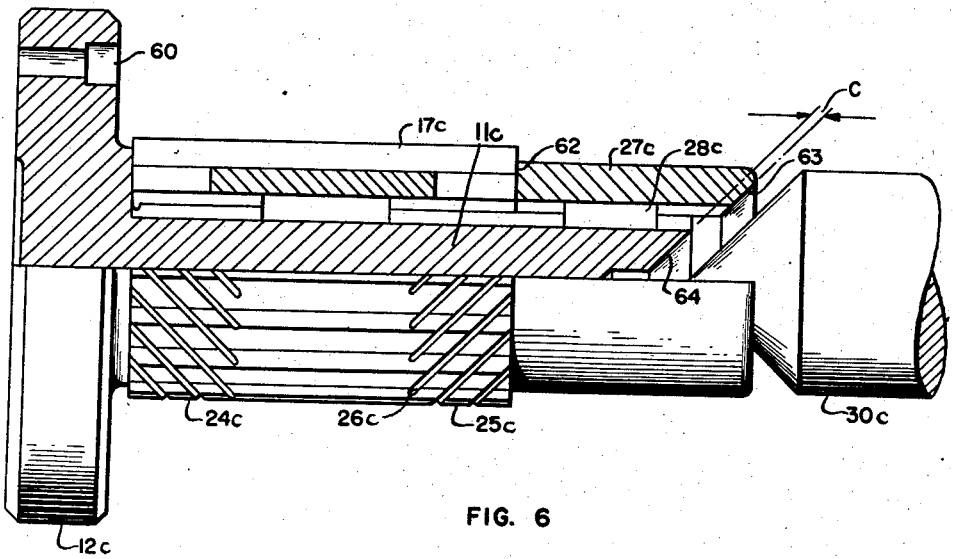
Fig. 6 is a splined arbor of the type similar to that shown in Fig. 1 but particularly adapted for power operation.

In the embodiment illustrated in Fig. 6, I have shown the supporting mandrel 11c with a radially extending flange, indicated in its entirety as 12c, and provided with bores and counter bores 60 to suitably affix supporting mandrel 11c to the end of a spindle or the like in a machine tool. I have replaced the washer illustrated in Fig. 1, with a power actuatable, axially movable, sleeve 27c keyed as at 28c to the mandrel 11c with the extreme left end 62 of the power sleeve located in abutment with the left end 23c of splined sleeve 17c. The extreme right end of the power sleeve 27c is conically chamfered as illustrated at 63. This conically chamfered surface 63 is adapted to match a similarly provided conically chamfered surface 64 provided on the supporting mandrel 11c. Both surfaces 63 and 64 are offset with respect to one another by a distance C whereby, when the power actuatable tail stock 30c is brought to bear on or is received in chamfer 63, the power sleeve 27c will move to the left a distance C thereby actuating portions 24c and 25c circumferentially in a manner identical with the sleeve 17 shown in Fig. 1. In this embodiment, it can be seen that the sleeve 27c is identical in function to the washer 27 of Fig. 1 and the power actuated tail stock 30c performs the function of the hand operated nut. Since the function and operation of the sleeve 17c in this embodiment is identical to the construction and operation of the sleeve illustrated in Fig. 1, no further description is deemed necessary.

It is to be noted also, that the flange 12c of the embodiment illustrated in Fig. 6 is equally adaptable for use in place of the type of connecting arrangement 12 illustrated in Fig. 1.

In the embodiment illustrated in Fig. 7, I have provided a chuck illustrated in its entirety as 10d having a radially extending flange 12d with bores and counterbores 60d whereby the chuck 10d may be suitably attached to the end of a spindle of a machine tool in a manner described in connection with Fig. 6. Chuck 10d is suitably bored centrally thereof as at 70 and counter bored as at 71 to provide a supporting member 11d for a sleeve 17d. Counter bore 71 is provided with an axial keying slot 14d whereby a sleeve 18d may be suitably keyed to the supporting member 11d by key 15d. On the extreme right end of supporting member 11d I have provided external threads 13d which cooperate with internal threads of a cap-like member 30d which, when actuated on the threads 13d by any suitable tool, will place an axial force on the splined sleeve 17d whereby the portions 24d, 25d thereof will be actuated circumferentially to hold an externally splined work piece (not shown). Cap-like member 30d is centrally bored as at 72 to permit the work piece to be inserted axially centrally of the chuck and except for the fact that the sleeve 18d is provided with internal splines and is internal of the supporting member 11d, the construction and function of this embodiment is substantially identical with the construction and operation described in connection with the preceding embodiments.

Thus, it can be seen that I have provided a new and improved chuck or mandrel particularly characterized in its simplicity which will center and work pieces having internal or external splines and which will very simply and directly translate axial force to circumferential force without the necessity of pins, pawls, complex transverse circumferentially operating mechanism and the like and while I have referred throughout my description of my invention to workpieces being chucked, it is obvious that my invention will chuck splined tools as well.

Figure 7:
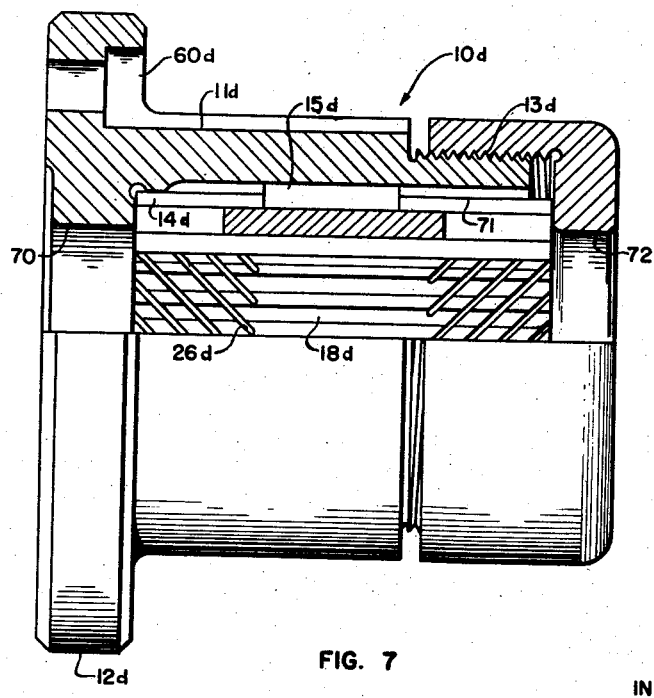
Fig. 7 is an elevational view, partially broken away, illustrating to advantage an internally splined sleeve incorporating my invention and forming a chuck.

Obviously, the sleeves of the type illustrated in Figs. 4 and 5 would be useable with the embodiment illustrated in Fig. 6 and the sleeves illustrated in Figs. 4 and 5 except with internal splines would be equally adaptable for use in the chuck illustrated in Fig. 7.

Where herein the various parts of my invention have been referred to as located in a right or left or an upper or lower or an inward or outward position, it will be understood that this is done solely for the purpose of facilitating description and that such references relate only to the relative positions of the parts as shown in the drawings.

Also, it is to be understood that, many changes and modifications may be made without departing from the scope or spirit of the invention and the invention is defined and comprehended solely by the appended claims which should be construed as broadly as the prior art will permit.

I claim:

1. In a device of the class described, a support member, longitudinally splined sleeve means operatively attached to said support member, means defining slots in said sleeve means oblique to said splines, and means for urging said means defining slots circumferentially in the same direction by the application of force axially to said sleeve means, whereby the sleeve means chucks a workpiece thereto, said sleeve means being secured to said support member, against relative rotation with respect to it, generally radially of that portion of the sleeve means which does not have the means defining slots.

2. In a device of the class described, a support member, longitudinally splined sleeve means operatively attached to said support means, means defining slots in said sleeve means oblique to said splines, and means operatively attached to said support member for urging a portion of said means defining slots circumferentially by the application of force axially to said sleeve, whereby the sleeve means chucks a workpiece thereto.

3. The device claimed in claim 2 wherein said means for urging a portion of said means defining slots circumferentially comprises means threadably received on said supporting member.

4. The device claimed in claim 2 wherein said means for urging a portion of said means defining slots circumferentially comprises means slidably disposed on said supporting member and adapted to be power actuated.

5. In a device of the class described, a support member, longitudinally externally splined sleeve means disposed on said support member, means defining slots in said sleeve means oblique to said splines, and means for urging a portion of said means defining slots circumferentially whereby the sleeve means chucks an internally splined workpiece thereto.

6. The device claimed in claim 5 wherein said sleeve means comprises three sleeve members secured together.

7. The device claimed in claim 5 wherein said sleeve means comprises two unconnected sleeve members.

8. The device claimed in claim 5 wherein said means defining slots are located on the ends of said sleeve means.

9. The device claimed in claim 5 wherein said means defining slots are located centrally of the ends of the sleeve means.

10. In a device of the class described, a support member, longitudinally internally splined sleeve means disposed in said support member, means defining slots in said sleeve means oblique to said splines, and means for urging a portion of said means defining slots circumferentially whereby the sleeve means chucks an externally splined workpiece thereto.

11. The device claimed in claim 10 wherein said sleeve means comprises three sleeve members secured together.

12. The device claimed in claim 10 wherein said sleeve means comprises two unconnected sleeve members.

13. The device claimed in claim 10 wherein said means defining slots are located on the ends of said sleeve means.

14. The device claimed in claim 10 wherein said means defining slots are located centrally of the ends of the sleeve means.

15. In an arbor, means defining support means, means defining longitudinally externally splined sleeve means operatively attached to said support means, means defining a portion in said sleeve means having slots oblique to said splines, and means causing circumferential movement of said slotted portion by application of axial force to said sleeve means to chuck a workpiece thereto.

16. In an arbor, means defining support means, means defining a longitudinally internally splined sleeve means operatively attached to said support means, means defining a portion in said sleeve means having slots oblique to said splines, and means causing circumferential movement of said slotted portion by application of axial force to said sleeve means to chuck a workpiece thereto.

<center>No references cited.</center>